United States Patent Office 3,477,987
Patented Nov. 11, 1969

3,477,987
PROTECTION OF OLEFINIC POLYMERS
Byron A. Hunter, Woodbridge, Conn., assignor to Uniroyal, Inc., a corporation of New Jersey
No Drawing. Original application Nov. 13, 1963, Ser. No. 323,251. Divided and this application Nov. 6, 1967, Ser. No. 680,957
Int. Cl. C08f 45/58
U.S. Cl. 260—45.85
5 Claims

ABSTRACT OF THE DISCLOSURE

The invention is the use of 2,6-dicyclooctyl-p-cresol (preparation of which by the alkylation of p-cresol with cyclooctene is disclosed) as an antioxidant for organic materials normally subject to oxidative deterioration, such as rubbers, plastics such as polypropylene, gum plastics, etc., petroleum products such as gasoline and oils, and vegetable and animal fats and oils. Use of this antioxidant in conjunction with a dialkyl ester of 3,3'-thiodipropionic acid such as dilauryl 3,3'-thiodipropionate is shown to be particularly effective for protecting solid polypropylene.

---

This application is a division of my copending application Ser. No. 323,251 filed Nov. 13, 1963, now abandoned.

This invention relates to a new chemical which is useful as an antioxidant for organic materials normally subject to oxidative deterioration.

The new compound of the present invention is 2,6-dicyclooctyl-p-cresol.

2,6-dicyclooctyl-p-cresol may readily be prepared by reacting p-cresol with cyclooctene in the presence of an alkylation catalyst such as boron trifluoride, sulfuric acid or other Lewis acid type catalyst, or in the presence of acid clays. At least two moles of cyclooctene are employed per mole of p-cresol.

Illustrative of the organic materials for which 2,6-dicyclooctyl-p-cresol is an effective antioxidant are rubbers, plastics, petroleum products such as gasoline and oils, and vegetable and animal fats and oils. Such rubbers may be natural rubber and synthetic rubbers, and mixtures thereof. The synthetic rubbers may be the products of aqueous emulsion polymerizations with a peroxide catalyst of various rubber-forming monomers. Such synthetic rubbers may be polymers of butadienes-1,3, e.g. butadiene-1, 3, 2-methylbutadiene-1,3 (isoprene), 2-chlorobutadiene-1,3 (chloroprene), 2,3-dimethylbutadiene-1,3, piperylene, and copolymers of mixtures thereof, and copolymers of mixtures of one or more such butadienes-1,3 with up to 70% of such mixtures of one or more monoethylenic compounds which contain a $CH_2=C<$ group where at least one of the disconnected valences is attached to an electronegative group, that is a group which substantially increases the electrical dissymmetry or polar character of the molecule. Examples of such monoethylenic compounds which are copolymerizable with butadienes-1,3, are aryl olefins, such as styrene, vinyl naphthalene, alpha methyl styrene, para chloro styrene, dichloro styrene, alpha methyl dichloro styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride; vinyl pyridines, such as 2-vinyl pyridine, 2-methyl-5-vinyl pyridine; vinyl carbazole. The synthetic rubber may also be a 1,4-polybutadiene or a 1,4-polyisoprene prepared by solution polymerization. Such 1,4-polybutadiene may be made by solution polymerization of butadiene-1,3 in the presence of a catalyst reaction product of an aluminum trialkyl, such as aluminum triethyl, and titanium iodide. Such 1,4-polyisoprene may be made by solution polymerization of isoprene in the presence of a catalyst reaction product of an aluminum trialkyl, such as aluminum triisobutyl, and titanium tetrachloride. The synthetic rubber may also be the product of the solution polymerization of a mixture of a major proportion of isoolefin and a minor proportion of a conjugated diene at low temperature in the presence of a Friedel-Crafts polymerization catalyst of the type of aluminum chloride or boron trifluoride. An example of a commercial synthetic rubber of this type is butyl rubber which is a copolymer of about 95 to 99 parts of isobutylene and correspondingly 5 to 1 parts of isoprene. The synthetic rubber may also be the product of the solution polymerization of a mixture of ethylene and at least one alpha olefin having the formula $CH_2=CHR$ in which R is an alkyl radical having 1 to 8 carbon atoms, e.g. propylene, with, if desired, a minor proportion of a nonconjugated diene, such as 1,4-hexadiene or dicyclopentadiene, in the presence of a catalyst reaction product of aluminum trialkyl, and titanium tetrahalide or vanadium tetrahalide or vanadium oxytrihalide, e.g. the reaction product of aluminum tridecyl and vanadium oxytrichloride. An example of a synthetic rubber of this type is a terpolymer of about 55% propylene, 41% ethylene and 4% 1,4-hexadiene. The plastics may be polyolefines, such as polyethylene and polypropylene, polyvinyl chloride, polyurethanes, polyamides, polycarbonates, resins such as styrene-acrylonitrile resins, so-called gum plastics, such as graft polymers of resin-forming monomers such as styrene and acrylonitrile on a rubber substrate, and mixtures of resins and rubbers, and mixtures of resins and graft polymers. Generally, from about 0.1 to 5 parts, by weight, of the 2,6-dicyclooctyl-p-cresol per 100 parts of rubber will be employed to stabilize rubbers against attack by oxygen. As an antioxidant for plastics, generally from 0.05 to 20 parts of 2,6-dicyclooctyl-p-cresol per 100 parts of the plastic will be used. As an antioxidant for petroluem products, such as gasoline and oils, generally 0.001 to 2 percent of the 2,6-dicyclooctyl-p-cresol based on the weight of the petroleum product will be used. As an antioxidant for vegetable and animal fats and oils, generally 10 to 2500 parts of the 2,6-dicyclooctyl-p-cresol per million parts by weight of the fat or oil will be used.

The following examples illustrate the preparation of 2,6-dicyclooctyl-p-cresol, and its use as an antioxidant for various organic materials normally subject to oxidative deterioration. All parts and percentages referred to herein are by weight.

Example 1

This example illustrates the preparation of 2,6-dicyclooctyl-p-cresol.

540 grams (5 moles) of p-cresol and 27 grams of boron trifluoride etherate (48% $BF_3$) were placed in a flask equipped with a mechanical stirrer, thermometer and an addition funnel. The mixture was warmed to 60° C. and stirred as 1100 grams (10 moles) of cyclooctene was slowly added over a course of 3½ hours. The temperature rose to 65° C. as the cyclooctene was added and the reaction mixture was maintained near that temperature during the addition. After all the cyclooctene had been introduced the mixture was stirred for an additional hour and was then allowed to stand overnight. On the following day the mixture was diluted with 1000 ml. of hexane and anhydrous ammonia gas was passed through the material to decolorize and destroy the boron fluoride catalyst. The mixture was treated with a diatomaceous filter aid (Celite) and filtered by means of a suction filter. The clear filtrate was transferred to a distilling apparatus and the hexane removed at atmospheric pressure. A vacuum of 0.6 mm. was applied and after removal of material boiling under 207° C. (a 10-inch Vigreux column was employed) the bulk of the product distilled very uniformly between 207–210° C. (0.6 mm.). The yield was 1173 grams. The product, 2,6-dicyclooctyl-p-cresol was obtained as a water-white viscous liquid. The material exhibited the following physical properties: Refractive index (25° C.)=1.5489. Specific gravity (25° C.)=1.044. The following analytical data were obtained: Carbon (calc.), 84.25%; found, 84.60%. Hydrogen calc.), 10.95%; found 11.27%.

Example 2

This example illustrates the effectiveness of 2,6-dicyclooctyl-p-cresol as an antioxidant for rubber.

An aqueous emulsion containing 47.5% dicyclooctyl-p-cresol was prepared using potassium oleate as the emulsifying agent. 4.22 parts of the emulsion (containing 2 parts of 2,6-dicyclooctyl-p-cresol) was added to 200 parts of a latex of a synthetic rubber terpolymer of about 39 parts of butadiene-1,3, 59 parts of styrene and 1 part of itaconic acid of 50% rubber content, followed by thorough blending with 2 parts of sodium polyacrylate thickener. A film 15 mil (0.015 inch) thick was cast on a glass plate and allowed to dry overnight. The film was stripped off and dried for one hour at 50° C. and was then heated for ten minutes at 120° C. A similar film was made in the same manner except no 2,6-dicyclooctyl-p-cresol was added to the latex. Both films were placed in a circulating air oven for sixteen hours at 270° F.

It was observed that the film containing no 2,6-dicyclooctyl-p-cresol had become hard and brittle whereas the film containing 2,6-dicyclooctyl-p-cresol was in good ondition, exhibiting good flexibility.

Example 3

This example illustrates the effectiveness as an antioxidant for solid polypropylene of 2,6-dicyclooctyl-p-cresol in a stabilizer combination with a dialkyl ester of 3,3'-thiodipropionic acid in which the alkyl radicals have 10 to 18 carbon atoms, e.g. didecyl, dilauryl, ditridecyl, or distearyl 3,3'-thiodipropionate, the preferred embodiment being dilauryl 3,3'-thiodipropionate. Generally 0.1% to 2% (preferably 0.25% to 0.5%) by weight of the polypropylene of each of the above compounds forming the stabilizer combination will be mixed with the solid polypropylene.

2,6-dicyclooctyl-p-cresol was blended with polypropylene powder in the ratio of 3 parts of the 2,6-dicyclooctyl-p-cresol to 1000 parts of polypropylene. A similar amount (0.3%) of dilauryl 3,3'-thiodipropionate was also added to the mix. The powder was then banded on a two-roll differential speed mill. A roll temperature of about 340° C. was used. After banding the material was cross-cut and end-rolled several times to assure complete dispersion of the chemicals in the polymer. The material was then sheeted off at about 75–100 mils thickness. The cooled product was chopped into small pieces and introduced into an injection molding machine and formed into 90 mil tensile bars (cylinder temperature 400° F., die temperature 175° F.). Similar samples were made with polypropylene alone, with polypropylene and dilauryl 3,3'-thiodipropionate alone (0.3%), and with polypropylene and dilauryl 3,3'-thiodipropionate (0.3%) and 2,6-ditertiary butyl-p-cresol (0.3%) which is a commercial antioxidant for polypropylene.

The tensile bars prepared as described were then placed in a circulating air oven at 300° F. and were observed periodically for signs of degradation, such as crazing or crumbling of the surface. The time for noticeable degradation was noted. The following table summarizes the results of these tests:

| Additives: | Time to degrade (days) |
|---|---|
| None | 1 |
| Dilauryl 3,3'-thiodipropionate (0.3%) | 12 |
| Dilauryl 3,3'-thiodipropionate (0.3%) 2,6-ditertiary butyl-p-cresol (0.3%) | 14 |
| Dilauryl 3,3'-thiodipropionate (0.3%) 2,6-dicyclooctyl-p-cresol (0.3%) | 53 |

The outstanding antioxidant effect of 2,6-di-cyclooctyl-p-cresol and its superiority over the 2,6-ditertiary butyl-p-cresol is very apparent.

Example 4

This example illustrates the use of 2,6-dicyclooctyl-p-cresol as an antioxidant for gum plastics.

Into a dry rubber-resin blend or gum plastic consisting of a mixture of 65 parts of a graft polymer of 35 parts of styrene and 16 parts of acrylonitrile graft polymerized on 50 parts of polybutadiene, and 35 parts of a separately prepared copolymer of 73 parts of styrene and 27 parts of acrylonitrile was intimately mixed one part of 2,6-dicyclooctyl-p-cresol. The mixture was pressed into a sheet and test samples were cut from the sheet using a hot knife. Similar test samples were prepared from the same rubber-resin blend containing no 2,6-dicyclooctyl-p-cresol. The test samples were placed in a circulating air oven at 350° F. It was observed that the rubber-resin blend containing no 2,6-dicyclooctyl-p-cresol turned jet black and carbonized within ten minutes. The rubber-resin blend containing the 2,6-dicyclooctyl-p-cresol was still in good condition after six hours in 350° F. oven, showing only some brown discoloration.

Example 5

This example and Example 6 illustrate the effectiveness of 2,6-dicyclooctyl-p-cresol as an anioxidan for vegetable and animal oils and fats. Twenty grams of raw linseed oil was treated with 0.2 g. (1%) of 2,6-dicyclooctyl-p-cresol. This mixture was poured into a Petri dish and allowed to stand at room temperature in air. A similar dish of raw linseed oil containing no antioxidant was prepared. After 10 days the unprotected oil formed a surface skin which became increasingly thick on standing. The linseed oil treated with the 2,6-dicyclooctyl-p-cresol showed no skin formation after 30 days' exposure to air.

Example 6

The 2,6-dicyclooctyl-p-cresol was tested as a fat antioxidant in the Swift Stability Test, also known as the Active Oxygen Method, described in Handbook of Food and Agriculture edited by Fred C. Blanck, p. 244, Reinhold Publishing Corporation, New York (1955). Washed air was passed at the rate of 140 ml. per minute into a 20-ml. sample of lard, preheated to 98.2° C., containing 0.01% of the 2,6-dicyclooctyl-p-cresol. After 4 hours the peroxide value of the lard, determined by a standard iodometric procedure, was 15. Unprotected lard oxidized in the same manner had a peroxide value of 178.

Example 7

This example illustrates the usefulness of 2,6-dicyclootyl-p-cresol as an antioxidant for petroleum products.

The 2,6-dicyclooctyl-p-cresol was evaluated in a concentration of 0.3% by weight of turbine oil using ASTM D-943 oxidation test for turbine oils. In the test, a mixture of 300 ml. of the oil and 60 ml. of distilled water is heated at 95° C. under a water cooled condenser. Copper and iron coils are submerged in the system and oxygen is bubbled through at the rate of three liters per hour. The break point is the amount of time required for the acidity of the mixture to rise to an acid number of 2 and/or for heavy sludge to develop with a corresponding large increase in viscosity.

The results showed less than 5 days to the break point for the oil alone with heavy sludge and an acid number greater than 2, whereas the oil containing the 2,6-dicyclooctyl-p-cresol after 10 days showed no sludge and the acid number was less than 2.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A composition comprising a polymer derived from at least one ethylenically unsaturated monomer containing as stabilizers 2,6-dicyclooctyl-p-cresol, and a dialkyl ester of 3,3'-thiodipropionic acid in which the alkyl radicals have from 10 to 18 carbon atoms.

2. A solid polypropylene composition comprising solid polypropylene containing a dialkyl ester of 3,3'-thiodipropionic acid in which the alkyl radicals have 10 to 18 carbon atoms and 2,6-dicyclooctyl-p-cresol.

3. A solid polypropylene composition comprising solid polypropylene containing 0.1% to 2% based on the weight of the polypropylene of a dialkyl ester of 3,3'-thiodipropionic acid in which the alkyl radicals have 10 to 18 carbon atoms and 0.1% to 2% based on the weight of the polypropylene of 2,6-dicyclooctyl-p-cresol.

4. A solid polypropylene composition comprising solid propylene containing dilauryl 3,3'-thiodipropionate and 2,6-dicyclooctyl-p-cresol.

5. A solid polypropylene composition comprising solid polypropylene containing 0.1% to 2% by weight of the polypropylene of each of dilauryl 3,3'-thiodipropionate and 2,6-dicyclooctyl-p-cresol.

References Cited

FOREIGN PATENTS 924,435    6/1963    Great Britain.

DONALD E. CZAJA, Primary Examiner

V. P. HOKE, Assistant Examiner

U.S. Cl. X.R.

99—163; 252—393; 260—45.95, 880, 398.5